United States Patent
Sato et al.

(10) Patent No.: US 10,359,735 B2
(45) Date of Patent: Jul. 23, 2019

(54) DISPLAY ARTICLE

(71) Applicant: Dai Nippon Printing Co., Ltd., Tokyo (JP)

(72) Inventors: Tomoe Sato, Tokyo (JP); Mitsuru Kitamura, Tokyo (JP); Koji Eto, Tokyo (JP); Tsuyoshi Yamauchi, Tokyo (JP); Nobuko Oikawa, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

(21) Appl. No.: 15/522,102

(22) PCT Filed: Oct. 26, 2015

(86) PCT No.: PCT/JP2015/080141
§ 371 (c)(1),
(2) Date: Apr. 26, 2017

(87) PCT Pub. No.: WO2016/068091
PCT Pub. Date: May 6, 2016

(65) Prior Publication Data
US 2017/0315506 A1    Nov. 2, 2017

(30) Foreign Application Priority Data
Oct. 27, 2014    (JP) ................... 2014-218316

(51) Int. Cl.
*G03H 1/02*    (2006.01)
*E06B 9/24*    (2006.01)
(Continued)

(52) U.S. Cl.
CPC .......... *G03H 1/024* (2013.01); *B42D 25/328* (2014.10); *E06B 7/28* (2013.01); *E06B 9/24* (2013.01);
(Continued)

(58) Field of Classification Search
None
See application file for complete search history.

(56) References Cited

U.S. PATENT DOCUMENTS

2003/0102660 A1*    6/2003    Rhoads ................ G06T 1/0064
                                                                        283/72
2006/0077542 A1    4/2006    Tanaka
(Continued)

FOREIGN PATENT DOCUMENTS

JP    2003-015510 A1    1/2003
JP    2005-205855 A1    8/2005
(Continued)

OTHER PUBLICATIONS

Sheng-Lih Yeh et al., "Dot-Matrix Hologram with Hidden Image," *Optical Engineering, Soc. of Photo-Optical Instrumentation Engineers*, Bellingham, vol. 41, No. 2, Feb. 1, 2002, pp. 314-318.
(Continued)

*Primary Examiner* — Jennifer D. Carruth
(74) *Attorney, Agent, or Firm* — Burr & Brown, PLLC

(57) ABSTRACT

A display article includes a plurality of display areas. Display areas adjacent to each other differ in at least one of an average hue, an average brightness and an average chroma and a first object to be displayed is formed by a combination of the plurality of display areas. At least one of the display areas includes a Fourier transform hologram configured to convert incident ray from a point light source or a laser light source into a second object to be displayed.

8 Claims, 8 Drawing Sheets

(51) Int. Cl.

| | | |
|---|---|---|
| *F21S 6/00* | (2006.01) | |
| *F21V 1/00* | (2006.01) | |
| *G03H 1/04* | (2006.01) | |
| *B42D 25/328* | (2014.01) | |
| *E06B 7/28* | (2006.01) | |
| *G03H 1/00* | (2006.01) | |
| *G03H 1/16* | (2006.01) | |
| *G09F 9/30* | (2006.01) | |
| *G09F 19/12* | (2006.01) | |
| *G09F 23/00* | (2006.01) | |
| *G09F 23/04* | (2006.01) | |
| *G03H 1/08* | (2006.01) | |
| *G03H 1/22* | (2006.01) | |
| *G03H 1/30* | (2006.01) | |
| *G03H 1/26* | (2006.01) | |

(52) U.S. Cl.
CPC ............ *F21S 6/00* (2013.01); *F21V 1/00* (2013.01); *G03H 1/0011* (2013.01); *G03H 1/02* (2013.01); *G03H 1/0236* (2013.01); *G03H 1/04* (2013.01); *G03H 1/08* (2013.01); *G03H 1/16* (2013.01); *G03H 1/2249* (2013.01); *G03H 1/2286* (2013.01); *G03H 1/30* (2013.01); *G09F 9/30* (2013.01); *G09F 19/12* (2013.01); *G09F 23/00* (2013.01); *G09F 23/04* (2013.01); *F21S 6/002* (2013.01); *G03H 2001/0055* (2013.01); *G03H 2001/0216* (2013.01); *G03H 2001/0292* (2013.01); *G03H 2001/261* (2013.01); *G03H 2240/22* (2013.01); *G03H 2240/43* (2013.01); *G03H 2260/14* (2013.01)

(56) References Cited

U.S. PATENT DOCUMENTS

| | | |
|---|---|---|
| 2007/0013983 A1 | 1/2007 | Kitamura et al. |
| 2007/0070477 A1 | 3/2007 | Eto et al. |

FOREIGN PATENT DOCUMENTS

| | | |
|---|---|---|
| JP | 2007-011156 A1 | 1/2007 |
| JP | 2007-041545 A1 | 2/2007 |
| JP | 2015-060113 A1 | 3/2015 |

OTHER PUBLICATIONS

Extended European Search Report (Application No. 15854231.6) dated Apr. 23, 2018.
International Search Report and Written Opinion (Application No. PCT/JP2015/080141) dated Jan. 26, 2016.
Japanese Office Action (Application No. 2014-218316) dated Sep. 2, 2016 (with English translation).
Japanese Office Action (Application No. 2014-218316) dated Oct. 28, 2016 (with English translation).
English translation of International Preliminary Report on Patentability (Chapter I) (Application No. PCT/JP2015/080141) dated. May 11, 2017, 6 pages.

\* cited by examiner

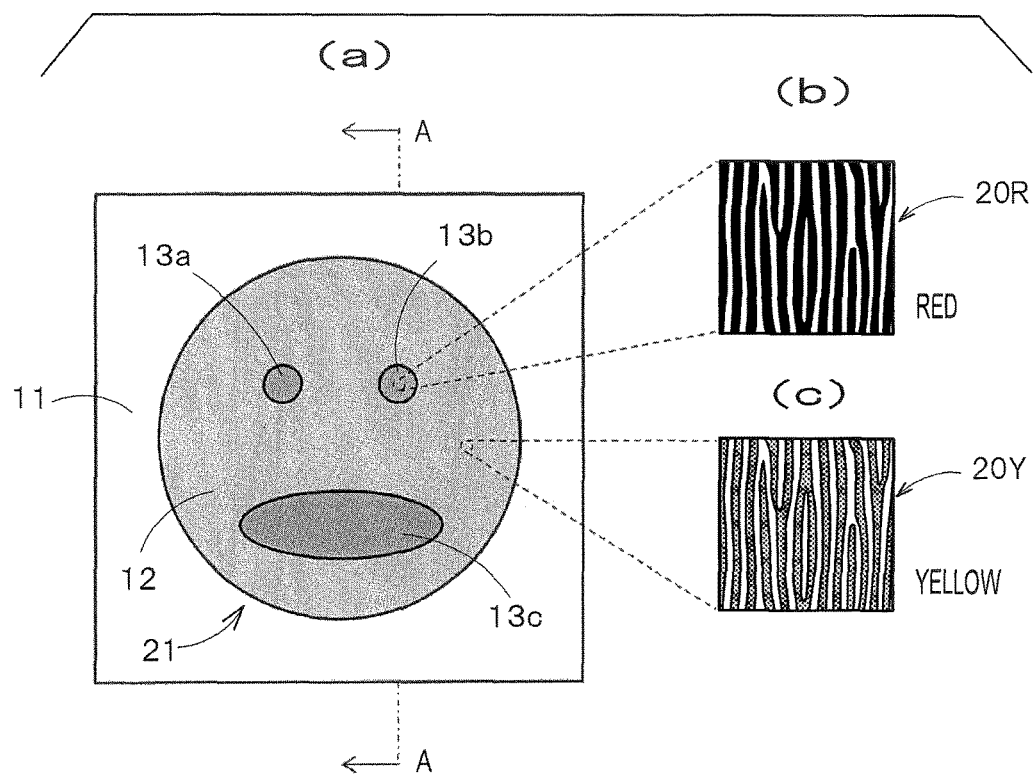
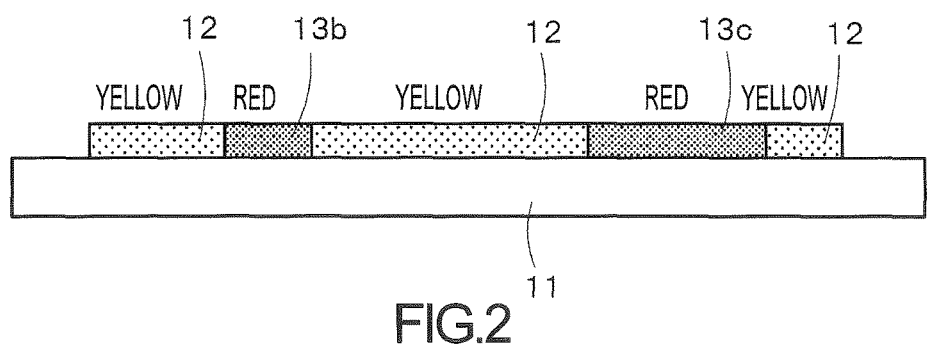
FIG.1
FIG.2

DISPLAY ARTICLE

BACKGROUND OF THE INVENTION

1. Field of the Invention

The present invention relates to a display article with wide designability in response to the presence/absence of a point light source. In addition, the present invention relates to a security medium, a window and lighting equipment with the display article.

2. Description of Related Art

A hologram is formed by making two light beams of equal wavelength (object light beam and reference light beam) interfere with each other, and recording, on a photosensitive material, a wavefront of the object light beam as interference fringes. A pattern of interference fringes to be included in a hologram may be computed by using a computer, based on a wavelength and an incident direction of intended illumination light for reproduction, as well as a shape and a position of an image to be reproduced, without using actual object light beam and actual reference light beam. A hologram thus obtained is also referred to as a "computer generated hologram" (CGH).

When a light beam in the same condition as the original reference light beam is applied to the hologram, the interference fringes cause diffraction so that a wavefront identical to that of the original object light beam is generated. In particular, since a Fourier transform hologram has the unique property that, when illuminated by a point light source, the incident ray is converted into a predetermined image to appear as an optical image, new applications are being examined (for example, JP2007-011156A and JP2007-041545A).

When the Fourier transform hologram is illuminated with light from a planar light source or a linear light source, the aforementioned conversion of the incident ray occurs all over the planar light source or the linear light source. As a result, optical images, which are supposed to appear as a single image, superpose along the shape of the planar light source or the linear light source, and information of an original object cannot appear as an optical image. Namely, when a display body including the Fourier transform hologram is used in a place where there is no point light source or laser light source, no optical image appears on the Fourier transform hologram, whereby a viewer cannot perceive said information of the optical image.

In addition, in order to cause an optical image to appear on a transmission Fourier transform hologram, the Fourier transform hologram itself is required to have a high light transmissivity. Thus, when a display body displays a design that is different from the optical image displayed on the Fourier transform hologram and is capable of being displayed without needing a point light source or a laser light source, in general, it is necessary to provide such a design by printing it on an area not overlapping with the Fourier transform hologram. Namely, on the Fourier transform hologram, only an optical image which appears when the Fourier transform hologram is illuminated by a point light source or a laser light source can be displayed.

As seen from the above, the Fourier transform hologram is burdened with poor designability when it is not illuminated by a point light source or a laser light source.

The Applicant has already proposed a laminated body in which an embossed hologram part and a transparent printed part overlap (Japanese Patent Application No. 2013-194397). When the laminated body is illuminated by a point light source, an optical image is reproduced by the embossed hologram part. On the other hand, when the laminated body is not illuminated by a point light source, a design is displayed by the transparent printed part. Thus, the laminated body can serve as a hologram body with wide designability in response to the presence/absence of a point light source. However, in order to have two design capabilities in this laminated body, it was necessary to prepare two optical systems, i.e., the embossed hologram part and the transparent printed part, respectively.

SUMMARY OF THE INVENTION

An embodiment of the present invention has been made to address these issues. The object of the present invention is to provide a display article with a simple structure and with wide display capabilities in response to the presence/absence of a point light source or a laser light source, as well as a security medium, a window and lighting equipment with such a display article.

A display article according to an embodiment of the present invention comprises a plurality of display areas, wherein:

display areas adjacent to each other differ in at least one of an average hue, an average brightness and an average chroma, and a combination of the plurality of display areas creates a first object to be displayed, and at least one display area includes a Fourier transform hologram configured to convert incident ray from a point light source or a laser light source, into a second object to be displayed.

In the display article according to an embodiment of the present invention, the Fourier transform hologram may be an amplitude hologram.

In the display article according to an embodiment of the present invention, the number of the display areas may be three or more.

A security medium according to an embodiment of the present invention comprises any of the aforementioned display article according to the present invention.

A window according to an embodiment of the present invention comprises any of the aforementioned display article according to the present invention.

A lighting equipment according to an embodiment of the present invention comprises any of the aforementioned display article according to the present invention.

According to an embodiment of the present invention, while the display article has a simple structure, it can have a wide designability in response to the presence/absence of a point light source or a laser light source. In addition, the security medium of the present invention can ensure significantly high level of security.

BRIEF DESCRIPTION OF THE DRAWINGS

FIG. 1(a) is a plan view of a display article according to one embodiment of the present invention.

FIG. 1(b) is a partially enlarged view of a certain display area in the display article of FIG. 1(a).

FIG. 1(c) is a partially enlarged view of another display area in the display article of FIG. 1(a).

FIG. 2 is a sectional view of the display article of FIG. 1(a) taken along the line A-A.

DETAILED DESCRIPTION OF THE INVENTION

Figure 3:
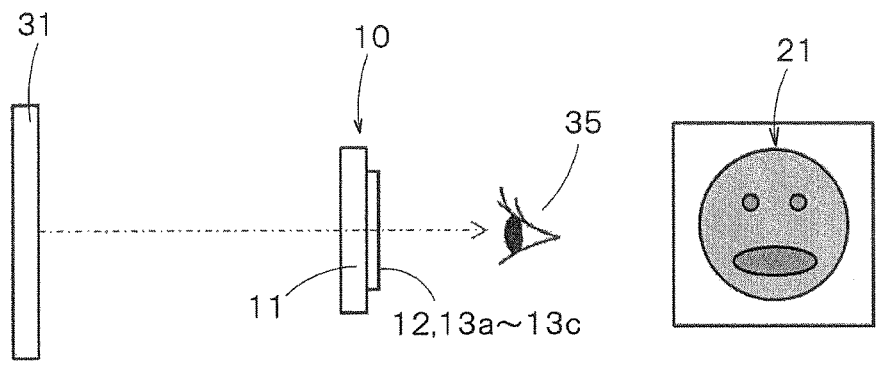
FIG. 3 is a view for explaining an object to be displayed which is displayed by the display article of FIG. 1(a) using light from a planar light source.

Hereinafter, embodiments of the present invention will be explained in detail with reference to the drawings. In the accompanying drawings of the present description, in order to simplify the drawings and make understanding easy, the scale, the ratio of height to width, etc., are modified or enlarged.

FIG. 1(a) is a plan view showing a display article according to one embodiment of the present invention. FIG. 1(b) is a partially enlarged view of a certain display area in the display article of FIG. 1(a). FIG. 1(c) is a partially enlarged view of another display area in the display article of FIG. 1(a). FIG. 2 is a sectional view of the display article of FIG. 1(a) taken along the line A-A.

As shown in FIGS. 1(a) to 1(c) and FIG. 2, a display article 10 according to this embodiment includes a transparent substrate 11, and a plurality of display areas (four display areas in the illustrated example) 12, and 13a to 13c disposed on the transparent substrate 11.

The transparent substrate 11 is for supporting the plurality of display areas 12, and 13a to 13c. Herein, the term "transparent" of the transparent substrate 11 includes the meaning of "translucent". The transparent substrate 11 has a transparency that allows light from a point light source to transmit therethrough.

A high transmission factor in the visible light region (hereinafter referred to also as "light transmission factor") is preferred for the transparent substrate 11. To be specific, for example, a light transmission factor of 80% or more is preferable. Particularly, a light transmission factor of 90% or more is more preferable. This is because, when the transparent substrate 11 has a light transmission factor within the above range, light can sufficiently transmit therethrough to reach the respective display areas 12, and 13a to 13c, whereby objects to be displayed that are displayed by the respective display areas 12, and 13a to 13c become easily visible. In this specification, the "light transmission factor" means a value which is measured based on JIS K 7361-1.

In addition, a low haze value is preferred for the transparent substrate 11. To be specific, for example, a haze value within a range between 0.01% and 5% is preferable. Particularly, a haze value within a range between 0.01% and 3% is more preferable, and a haze value within a range between 0.01% and 1.5% is the most preferable. This is because, when the transparent substrate 11 has a haze value within the above range, the objects to be displayed that are displayed by the respective display areas 12, and 13a to 13c can be displayed without inhibiting visibility. In this specification, the "haze value" means a value which is measured based on JIS K 7136.

The material of the transparent substrate 11 is not specifically limited, as long as it has the aforementioned light transmission factor and haze value. For example, resin films made of polyethylene terephthalate, polycarbonate, acryl resin, cycloolefin resin, polyester resin, polystyrene resin, acryl styrene resin or the like, and glass such as quartz glass, Pyrex (registered trademark), synthetic quartz plate or the like may be used. Particularly, in terms of low weight and resistance to damage, a resin film is preferably used. A polycarbonate is most suitable from the viewpoint of birefringence.

The transparent substrate 11 may contain a fire retardant. In this case, the display article 10 according to this embodiment can be used for lighting equipment, etc., which requires the substrate 11 to have fire retardant properties. As the fire retardant, any fire retardant such as an inorganic fire retardant such as a phosphorous-based fire retardant, a nitrogen-based fire retardant, a metallic salt-based fire retardant, a hydroxide-based fire retardant and an antimony-based fire retardant, or a silicone-based fire retardant may be used. The amount of fire retardant to be added is optional and can be suitably set, as long as the transparent substrate 11 can have the desired light transmission factor and haze value.

In addition, the transparent substrate 11 may contain an ultraviolet absorber, a heat ray absorber or the like. In this case, deterioration of the display areas 12, and 13a to 13c caused by exposure to the ultraviolet and/or the heat ray can be prevented, and the display article 10 according to this embodiment can be used as an ultraviolet absorption filter or a heat ray cut filter.

A thickness of the transparent substrate 11 may be a thickness by which the transparent substrate 11 can have rigidity and strength for supporting the display areas 12, and 13a to 13c. For example, a thickness about 0.005 mm to 5 mm is preferable. Particularly, a thickness within a range between 0.02 mm and 1 mm is more preferable. A shape of the transparent substrate 11 is not specifically limited, and can be suitably selected depending on use of the display article 10.

In order to improve adhesion to another layer, a surface of the transparent substrate 11 may be subjected to a corona treatment.

Hereinafter, structures of the display areas 12, and 13a to 13c will be described. In the below description, the respective display areas 12, and 13a to 13c are sometimes referred to as "first to fourth display areas 12, and 13a to 13c".

As shown in FIG. 1(a), among the plurality of display areas 12, and 13a to 13c, display areas which are adjacent to each other differs in at least one of average hue, average brightness and average chroma. A first object 21 to be displayed is formed by a combination of the display areas 12, and 13a to 13c.

Strictly speaking, the average hue, the average brightness and the average chroma of the respective display areas 12, and 13a to 13c are obtained by checking the hue, the brightness and the chroma at every point in the target display areas, by using a colorimeter or a spectrocolorimeter, and by calculating average values of them. However, actually, the average hue, the average brightness and the average chroma can be specified by checking, in one section having an area that is expected to reflect an overall tendency of the items to be checked (hue, brightness and chroma), the hue, the brightness and the chroma at points the number of which is considered to be adequate in consideration of dispersion degree of items to be checked, and by calculating average values of them. For example, the average hue, the average brightness and the average chroma of the display areas 12, and 13a to 13c can be specified by measuring the hue, the brightness and the chroma at thirty points in an area of 30 mm×30 mm of each of the target display areas 12, 13a to 13c, by using a colorimeter or a spectrocolorimeter, and calculating the average values of them.

It is sufficient that the difference in average hue, average brightness or average chroma between display areas adjacent to each other is a difference by which a viewer can distinguish between display areas adjacent to each other. The degree of difference can be suitably selected depending on the content of the first object 21 to be displayed. To be specific, display areas adjacent to each other can have colors that differ from each other by 2 or more of a color difference $LE^*_{ab}$ in the $L^*a^*b^*$ colorimetric system specified in JIS Z8781-4:2013.

In the illustrated example, the first object 21 to be displayed representing an illustration of a human face is formed by the combination of the first to fourth display areas 12, and 13a to 13c. In more detail, the first display area 12 has a circular shape, and its average hue is yellow. The first display area 12 corresponds to a profile of the human face in the first object 21 to be displayed. The second display area 13a and the third display area 13b each have a circular shape smaller than that of the first display area 12, and their average hue is red. The second display area 13a and the third display area 13b are aligned in the right and left direction inside the first display area 12, and correspond to right and left eyes of the human face in the first object 21 to be displayed. The fourth display area 13c has an elliptical shape, and its average hue is red. The fourth display area 13c is arranged to extend in the right and left direction inside the first display area 12 and below the second display area 13a and the third display area 13b, and corresponds to a mouth of the human face in the first object 21 to be displayed.

The content of the first object 21 to be displayed formed by the combination of the plurality of display areas 12, and 13a to 13c is not specifically limited, and may be a figure representing a letter, a sign, a mark, an illustration, a character or a picture, etc., or various literal information such as a company name, a trade name, a selling point, a catch phrase, a manual and so on.

In addition, the number of display areas 12, and 13a to 13c is not specifically limited. However, the larger the number of the display areas 12, and 13a to 13c is, the more the first object 21 to be displayed can be complicated. Thus, the number of the display areas 12, and 13a to 13c is preferably three or more.

As shown in FIGS. 1(b) and 1(c), the at least one display area (all the display areas 12, and 13a to 13c in the illustrated example) includes Fourier transform holograms 20R and 20Y configured to convert incident ray from a point light source into a second optical image to be displayed.

In this embodiment, each Fourier transform hologram 20R, 20Y is a computer generated hologram (CGH). Image data of an original design of the second object to be displayed are multivalued to a Fourier transform image of a binary level or more (binary, tertiary, octal). A plurality of the Fourier transform images are arranged in a desired range in longitudinal and transverse directions. The Fourier transform hologram 20R, 20Y corresponds to a pattern of these Fourier transform images.

The content of the second objet to be displayed is not specifically limited, and may be a figure representing a letter, a sign, a mark, an illustration, a character or a picture, etc., or various literal information such as a company name, a brand name, a selling point, a catch phrase, a manual and so on.

In this embodiment, the Fourier transform hologram 20R, 20Y is a transmission amplitude hologram. Namely, an intensity distribution of bright and dark interference fringes is recorded as a change in shading on the Fourier transform hologram 20R, 20Y. The Fourier transform hologram 20R, 20Y are configured to cause diffraction by variation in light transmission factor and offer a reconstructed image as the second object to be displayed.

For example, a color resist material containing a photosensitive resin and a colorant may be used as a material of the Fourier transform hologram 20R 20Y. The color resist material has a light transmission factor that is lower than the light transmission factor of the transparent substrate 11, so that shading varies in response to the presence/absence of the color resist material on the transparent substrate 11. The light transmission factor of the color resist material 11 may be zero, i.e., the color resist material 11 may be opaque.

The photosensitive resin may be, for example, an acryl-based resin, a polyurethane-based resin, a polyester-based resin, a fluorine-based resin, a silicone-based resin, an epoxy-based resin, a polyolefin-based resin, a melamine resin, a copolymer of vinyl chloride-vinyl acetate, and the like. In addition, the colorant may be, for example, a pigment such as an inorganic pigment or an organic pigment, a dye such as an acidic dye, a direct dye, a disperse dye, an oil-soluble dye, a metal containing oil-soluble dye, a sublimated coloring matter, and the like.

The color resist material may contain a fire retardant. In this case, the display article 10 according to this embodiment can be used for lighting equipment, etc., which is required to have the fire retardant property. The fire retardant are the same types of fire retardant as those of the fire retardant used in the aforementioned transparent substrate 11, and description thereof is omitted. An amount of the fire retardant to be added can be suitably set, as long as the fire retardant does not affect the optical properties of the Fourier transform hologram 20R, 20Y.

The thickness of the display areas 12, and 13a to 13c is not specifically limited, and may be about 0.1 μm to 50 μm, for example.

Figure 5:
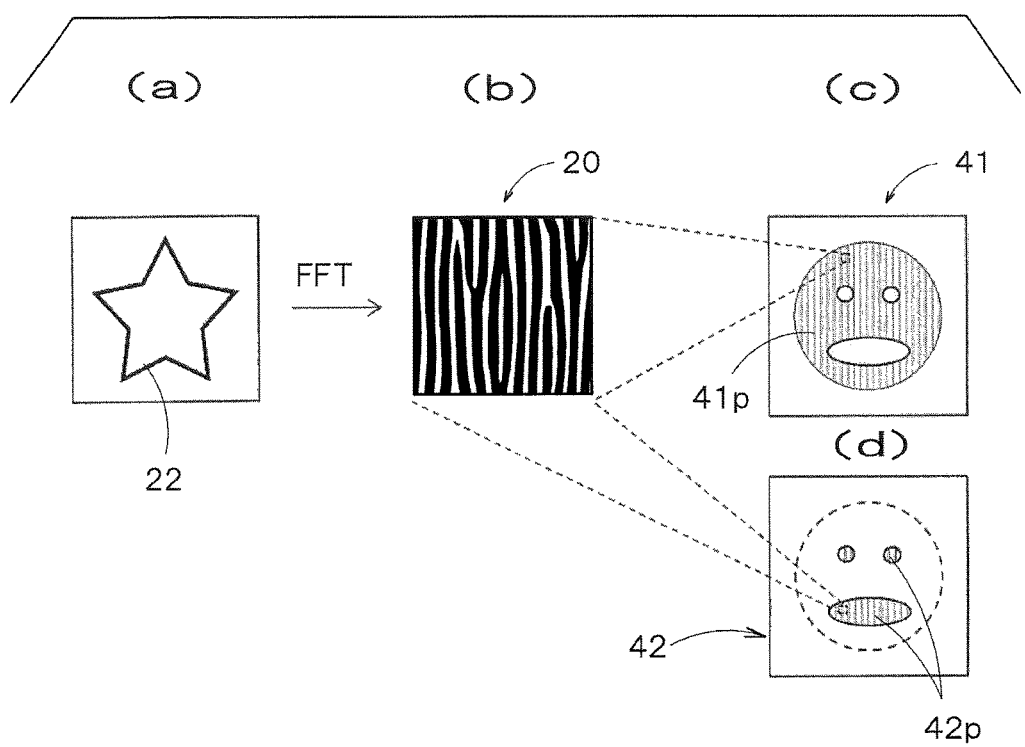
FIGS. 5(a) to 5(d) are views for explaining a method of manufacturing the display article of FIG. 1(a).
Figure 6:
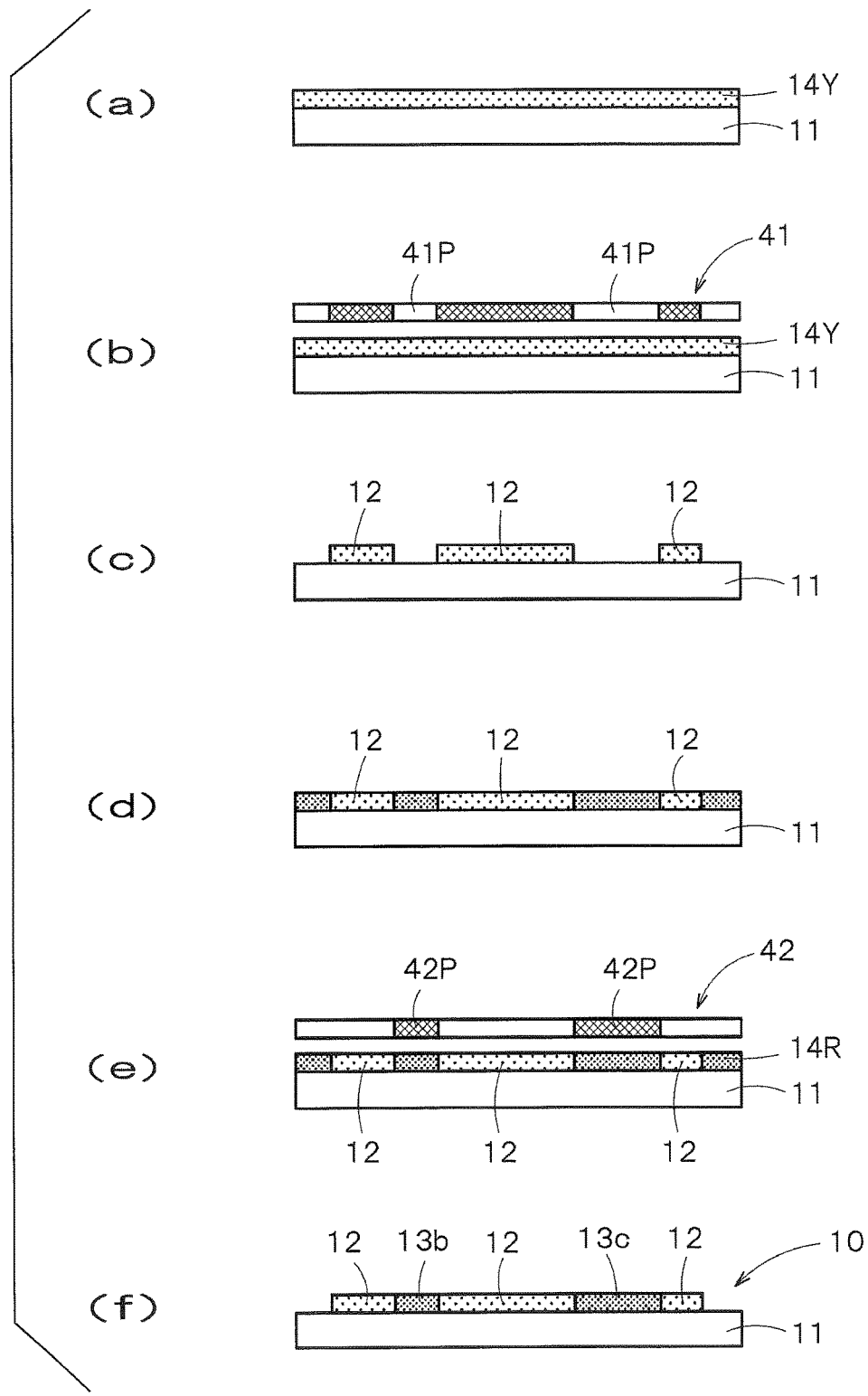
FIGS. 6(a) to 6(f) are views for explaining the method of manufacturing the display article of FIG. 1(a).

Hereinafter, an example of a method of manufacturing the display article 10 as structured above will be described with reference to FIGS. 5 and 6.

Firstly, as shown in FIG. 5(a), an original design of the second object 22 to be displayed is prepared. In the illustrated example, a star mark is used as the second object 22 to be displayed.

Next, as shown in FIG. 5(b), a Fourier transform image 20 of the original design is created by a method of calculation such as FFT (Fast Fourier Transform) by using a computer. In the illustrated example, the Fourier transform image is a Fourier transform image of a binary level, but may be a Fourier transform image of a multilevel greater than a binary level (e.g., tertiary level, octal level). In addition, in the illustrated example, in the Fourier transform image, a ratio of a width of one interference fringe relative to a distance (pitch) between centers of adjacent interference fringes is set to be 50%, but the ratio may be set smaller than 50% or larger than 50%. When the display article 10 is used in a window or lighting equipment, which is required to have light permeability, the smaller ratio of a width of one interference fringe relative to a distance (pitch) between centers of adjacent interference fringes is preferable because the smaller the ration is, the larger the average brightness of the display areas becomes.

Next, as shown in FIG. 5(c), by using the Fourier transform image 20 obtained, the display areas 12, and 13a to 13c are divided into groups according to the difference in at least one of average hue, average brightness and average chroma, and different photomasks 41, 42 are made for the groups. In the illustrated example, as the photomask 41 for the first display area 12, there is formed a photomask having an area 41P corresponding to the first display area 12 where a plurality of patterns of interference fringes formed in accordance with the Fourier transform images 20 are arranged in the longitudinal and transverse directions and the other areas which are all opened. In addition, as the photomask 42 for the second to fourth display areas 13a to 13c, a photomask having an area 42P corresponding to the second to fourth display areas 13a to 13c is formed. In the area 42P, a plurality of patterns of interference fringes formed in accordance with the Fourier transform images 20 are arranged in the longitudinal-transverse directions. The other area of the photomask as the photomask 42 is uniformly opened.

Next, as shown in FIG. 6(a), a positive-type color resist material 14Y containing a yellow colorant is applied onto the transparent substrate 11.

Next, as shown in FIG. 6(b), the photomask 41 for the first display area 12 is placed oppositely to the color resist material 14Y on the transparent substrate 11. The color resist material 14Y is irradiated with ultraviolet light through the photomask 41 so as to be exposed to the light.

Next, as shown in FIG. 6(c), the parts of the color resist material 14Y which have been exposed to the ultraviolet light are dissolved and removed in developer. Thereafter, the color resist material 14Y remaining on the transparent substrate 11 is heated and solidified. Thus, the first display area 12 including the Fourier transform hologram 20Y is formed.

Next, as shown in FIG. 6(d), a positive-type color resist material 14R containing a red colorant is applied onto the transparent substrate 11.

Next, as shown in FIG. 6(e), the photomask for the second to fourth display areas 13a to 13c is placed oppositely to the color resist material 14R on the transparent substrate 11. The color resist material 14R is irradiated with ultraviolet light through the photomask 42 so as to be exposed to the light.

Next, as shown in FIG. 6(f), the parts of the color resist material 14R which have been exposed by the ultraviolet light are dissolved and removed in developer. Thereafter, the color resist material 14R remaining on the transparent substrate 11 is heated and solidified. Thus, the second to fourth display areas 13a to 13c including the Fourier transform hologram 20R are formed.

In this manner, the display article 10 shown in FIGS. 1(a) to 1(c) and FIG. 2 can be obtained.

Hereinafter, a function of this embodiment will be described with reference to FIGS. 3 and 4.

Figure 4A:
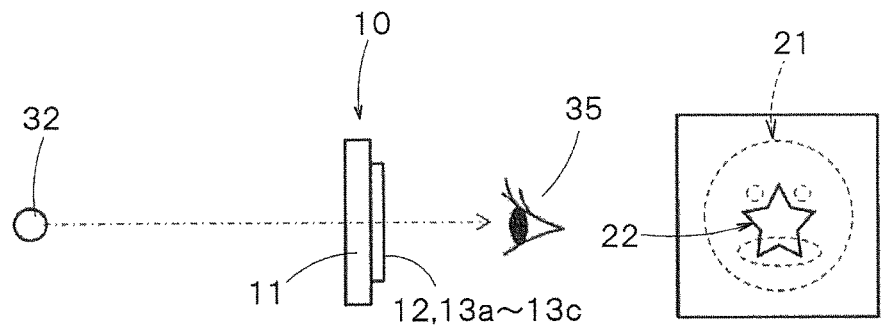
FIG. 4A is a view for explaining an object to be displayed which is displayed by the display article of FIG. 1(a) using light from a point light source.
Figure 4B:
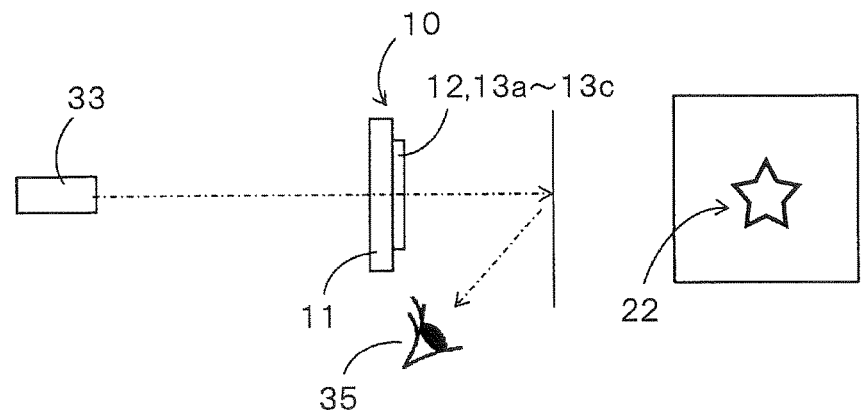
FIG. 4B is a view for explaining an object to be displayed which is displayed by the display article of FIG. 1(a) using light from a laser light source.

FIG. 3 is a view for explaining the first object 21 to be displayed, which is displayed by the display article 10 using light from a planar light source 31. FIG. 4A is a view for explaining the second object 22 to be displayed, which is displayed by the display article 10 using light from a point light source 32. FIG. 4B is a view for explaining the second object 22 to be displayed, which is displayed by the display article 10 using light from a laser light source 33.

As shown in FIG. 3, when a viewer 35 observes the display article 10 that is illuminated with light from the planar light source 31 such as a fluorescent lighting, the viewer 35 can perceive the macroscopic first object 21 to be displayed (at the same scale as the overall display area) formed by the combination of the plurality of display areas 12, and 13a to 13c. At this time, the Fourier transform holograms 20R and 20Y included in the respective display areas 12, and 13a to 13c convert the respective light emitted from every point of the planar light source, into the second object 22 to be displayed. Thus, optical images of the second object 22 to be displayed are superposed all over the shape of the planar light source and become a non-optical image. Thus, the optical image of the second object 22 to be displayed is not caused to appear on the display article 10. Thus, the viewer 35 cannot perceive the microscopic second object 22 to be displayed (at a scale smaller than each display area).

On the other hand, as shown in FIG. 4A, when the viewer 35 observes the display article 10 that is illuminated with light from the point light source 32 such as an LED light source, the optical image of the second object 22 to be displayed is caused to appear on the display article 10, due to conversion of the incident ray by the Fourier transform holograms 20R and 20Y included in one of the display areas 12, 13a to 13c. Thus, the viewer can perceive the microscopic second object 22 to be displayed.

In addition, as shown in FIG. 4B, when the display article 10 that is illuminated with light from the laser light source 33 and the viewer 35 observes the transmitted light through the display article 10, the optical image of the second object 22 to be displayed is caused to appear on a surface illuminated with the transmitted light, due to the conversion of the incident ray by the Fourier transform holograms 20R and 20Y included in one of the display areas 12, 13a to 13c. Thus, the viewer can perceive the microscopic second object 22 to be displayed.

As described above, according to this embodiment, the first object 21 to be displayed is formed by the combination of the plurality of display areas 12, and 13a to 13c, and at least one of the display areas 12, and 13a to 13c includes the Fourier transform hologram 20R, 20Y configured to convert incident ray from the point light source 32 or the laser light source 33, into the second object 22 to be displayed. Thus, this single set of display areas 12, and 13a to 13c can display the macroscopic first object 21 to be displayed in a place where the point light source 32 or the laser light source 33 is absent, and can display the microscopic second object 22 to be displayed in a place where the point light source 32 or the laser light source 33 is present. Thus, in spite of the simple structure, the display article 10 can have wide designability in response to the presence/absence of the point light source 32 or the laser light source 33.

Various changes and modifications may be made to the embodiments described above. A variation will be described with reference to the drawings. In the following description and relevant drawings, the same reference numerals are used to indicate the same or equivalent components used in the above-described embodiments, and duplicate descriptions thereof are omitted. In addition, when it is apparent that the functions and effects obtained in the above-described embodiment can be obtained in the variation, its descriptions may be omitted.

Figure 7:
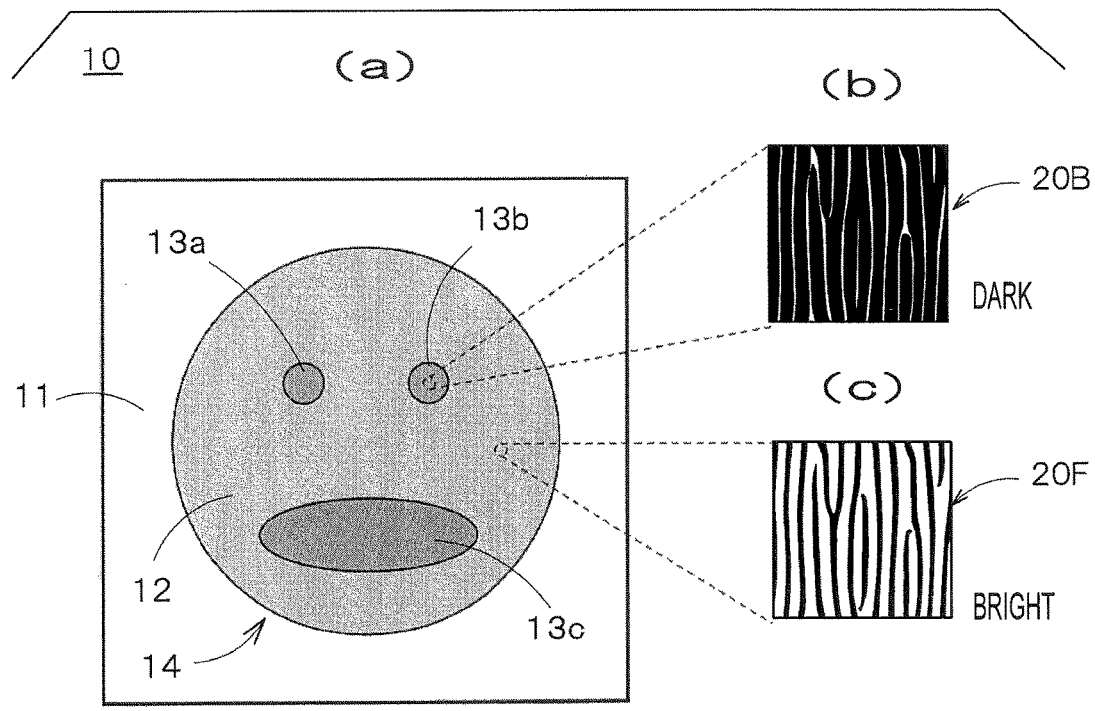
FIGS. 7(a) to 7(c) correspond to FIGS. 1(a) to 1(c), respectively, and are views for explaining a variation of the display article.

In the example shown in FIGS. 1(a) to 1(c), in the display areas adjacent to each other, the materials including the Fourier transform holograms 20R and 20Y differ in at least one of the hue, the brightness or the chroma, so that the adjacent display areas differ in the average hue, the average brightness or the average brightness. However, the present invention is not limited thereto. For example, as shown in FIGS. 7(a) to 7(c), although the materials forming Fourier transform holograms 20B and 20F may be the same in the hue, the brightness or the chroma, the display areas adjacent to each other may differ from each other in average brightness because of the difference in ratio of a width of one interference fringe relative to a distance (pitch) between centers of adjacent interference fringes. To be specific, in the Fourier transform hologram 20B shown in FIG. 7(b), a ratio of a width of one interference fringe relative to a distance (pitch) between centers of adjacent interference fringes is larger than 50% in order to reduce the average brightness of the second to fourth display areas 13a to 13c. On the other hand, in the Fourier transform hologram 20F shown in FIG. 7(c), a ratio of a width of one interference fringe relative to a distance (pitch) between centers of adjacent interference fringes is less than 50% to increase the average brightness of the first display area 12. In this case, the chroma of the display areas adjacent to each other may be either the same or different.

The embodiment shown in FIGS. 7(a) to 7(c) can provide the same functions and effects as those of the above-described embodiment.

In addition, in the pattern of the interference fringes of the above-described embodiment, the shade of the color (transmission factor) is changed in response to the presence/absence of the color resist material on the transparent substrate 11. However, not limited thereto, the shade of the color (transmission factor) may be changed in response to difference of the color resist material in a concentration and/or a thickness.

Figure 8:
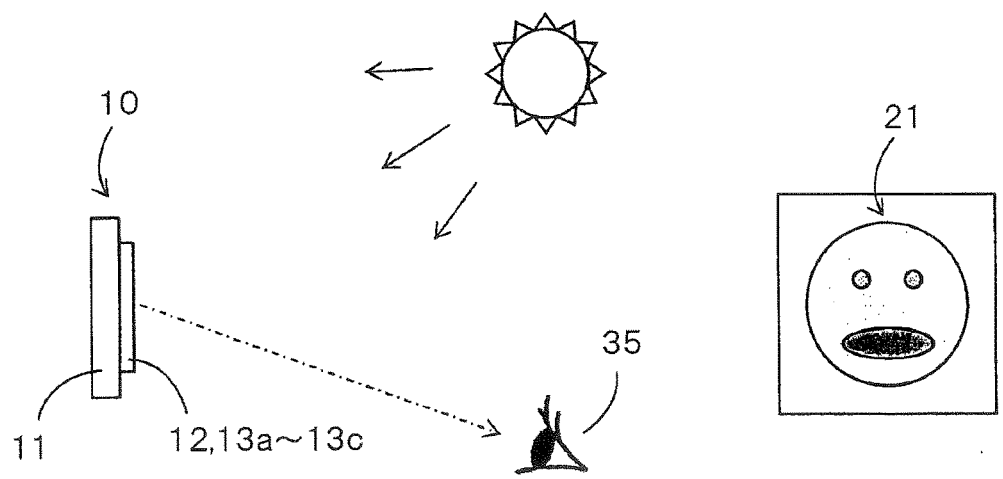
FIG. 8 is a view for explaining an object to be displayed which is displayed by the variation of the display article of FIG. 1(a) in diffused light.
Figure 9:
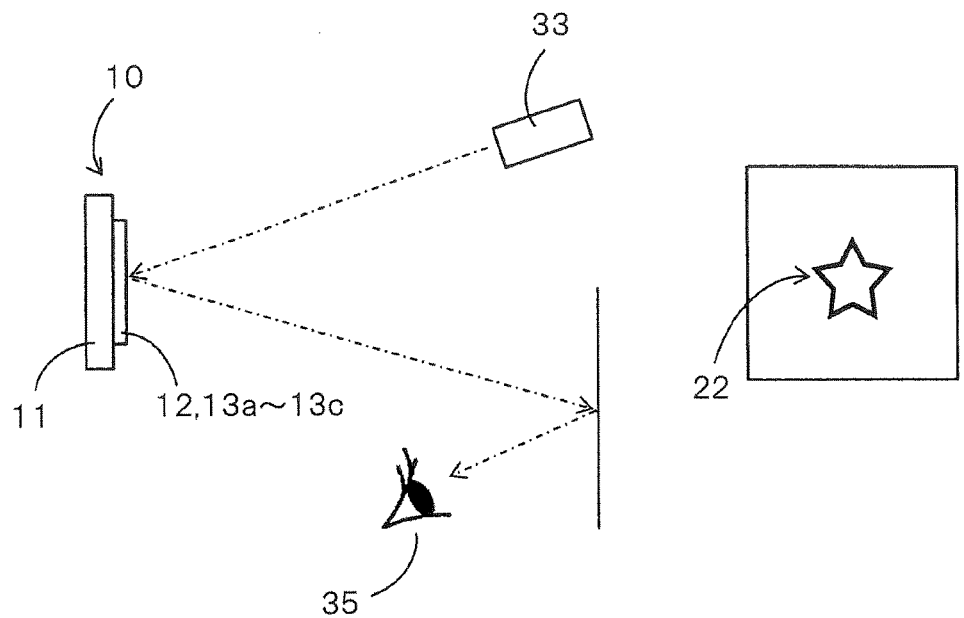
FIG. 9 is a view for explaining an object to be displayed which is displaced by the variation of the display article of FIG. 1(a) using light from a laser light source.

In addition, in the above-described embodiment, the Fourier transform holograms 20R, 20Y, 20B and 20F are transmission holograms. However, not limited thereto, the Fourier transform holograms 20R, 20Y, 20B and 20F may be reflection holograms. In this case, as shown in FIG. 8, when the display article 10 is observed in diffused light such as light from a ceiling lighting or sunlight, the macroscopic first object 21 to be displayed, which is formed by the combination of the plurality of display areas 12, and 13 a to 13c, can be viewed. On the other hand, as shown in FIG. 9, when reflection light from the display article 10 illuminated with light from the laser light source 33 is observed, the optical image of the second object 22 to be displayed is viewed on the display article 10, due to the conversion of the incident ray by the Fourier transform holograms 20R, 20Y included in one of the display area 12, 13a to 13c, whereby the viewer can view the microscopic second object 22 to be displayed.

Hereinafter, application examples of the display article 10 according to this embodiment will be described.

Figure 10:
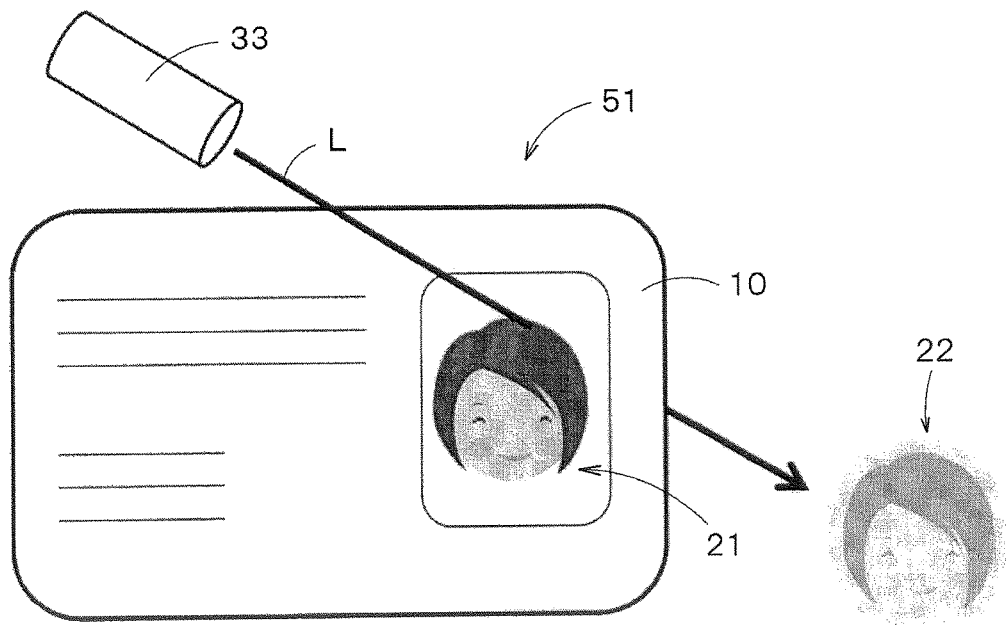
FIG. 10 is a view of an example of a security medium comprising the display article of FIG. 1(a).

FIG. 10 shows an example of a security medium 51 on which the display article 10 of the above-described embodiment is installed. The security medium 51 herein means an information storage medium, which is required to ensure high level of security, including an ID certificate such as a passport or a license, and a card medium such as a cash card or a credit card, for example.

In the example shown in FIG. 10, the security medium 51 is an ID certificate such as a passport, and includes the display article 10 according to the above-described embodiment. This display article 10 is configured to display, as the first object to be displayed 21 and the second object to be displayed 22, a photograph of an owner's face of the ID certificate.

In the case of the security medium 51 shown in FIG. 10, when observing the display article 10 in diffused light such as light from a ceiling lighting or sunlight, the viewer can perceive the first object 21 to be displayed, which is displayed by the combination of the plurality of display areas.

On the other hand, when the display article 10 is irradiated with laser light L from the laser light source 33, the Fourier transform hologram included in the display area converts the laser light L into the second object 22 to be displayed. Thus, the viewer can perceive the optical image of the second object 22 to be displayed. In addition, when the security medium 51 is located between a point light source such as an LED and the viewer and the the point light source is seen through the display article 10 installed on the security medium 51, the viewer can also perceive the second object 22 to be displayed, which is displayed by the display article 10 with light irradiated from the point light source.

Thus, the viewer who is looking at the security medium 51 can perceive either the first object 21 to be displayed or the second object 22 to be displayed in response to the presence/absence of a point light source or a laser light source. Thus, since the viewer can confirm a correspondence between the first object 21 to be displayed and the second object 22 to be displayed, it is possible to prevent damage caused by fake identification photographs or the like. In particular, in the case of an ID certificate, identity verification can be realized at highly security level. In addition, since the display of the first object 21 to be displayed and the display of the second object 22 to be displayed are carried out by the same interference fringes, falsification is difficult (for example, even if the first object 21 to be displayed is forged, the display of the second object 22 to be displayed does not follow thereto). Thus, significantly high level of security can be ensured.

Figure 11:
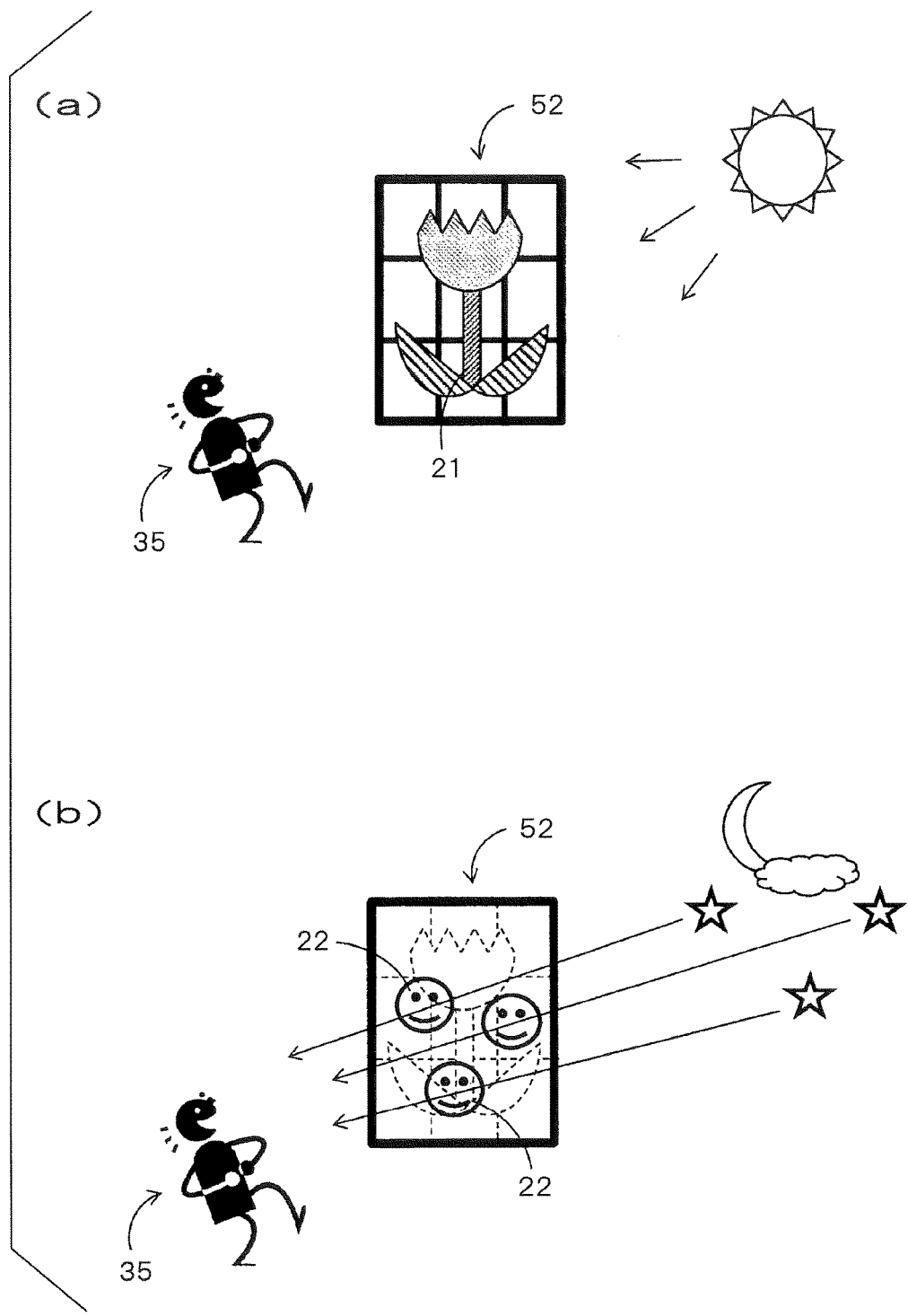
FIGS. 11(a) and 11(b) are views of an example of a window comprising the display article of FIG. 1(a).

FIG. 11(a) and FIG. 11(b) show an example of a window including the display article 10 of the above-described embodiment.

The window 52 shown in FIG. 11(a) and FIG. 11(b) is a stained-glass window including the display article 10 according to the above-described embodiment. The display article 10 is configured to display a pattern of plant as the first object 21 to be displayed, and to display an illustration of faces as the second object 22 to be displayed.

As shown in FIG. 11(a), the viewer 35 who is looking at the window 52 in the daytime from the room can perceive the first object 21 to be displayed, which is displayed by the display article 10 with incident ray from the sun.

On the other hand, as shown in FIG. 11(b), the viewer 35 who is looking at the window 52 in the nighttime from the room can perceive the second object 22 to be displayed, which is displayed by the display article 10 with incident ray from a star, because the star functions as a point light source. In addition, although illustration is omitted, when the viewer views outside from the room through the window 52, the viewer can perceive the second object 22 to be displayed by incident ray from an outside point light source such as one in a night scene, a street lamp and a lighting on a vehicle, in addition to a star. On the other hand, when the viewer views the room from outside through the window 52, the viewer can perceive the second object 22 to be displayed by incident ray from a point light source such as an LED lighting or a candle.

In this manner, the viewer who views the window 52 can view the first object 21 to be displayed and the second object 22 to be displayed in response to the presence/absence of a point light source. Thus, the viewer can enjoy a variety of designs with the passage of time, without energy such as electric power being consumed.

Figure 12:
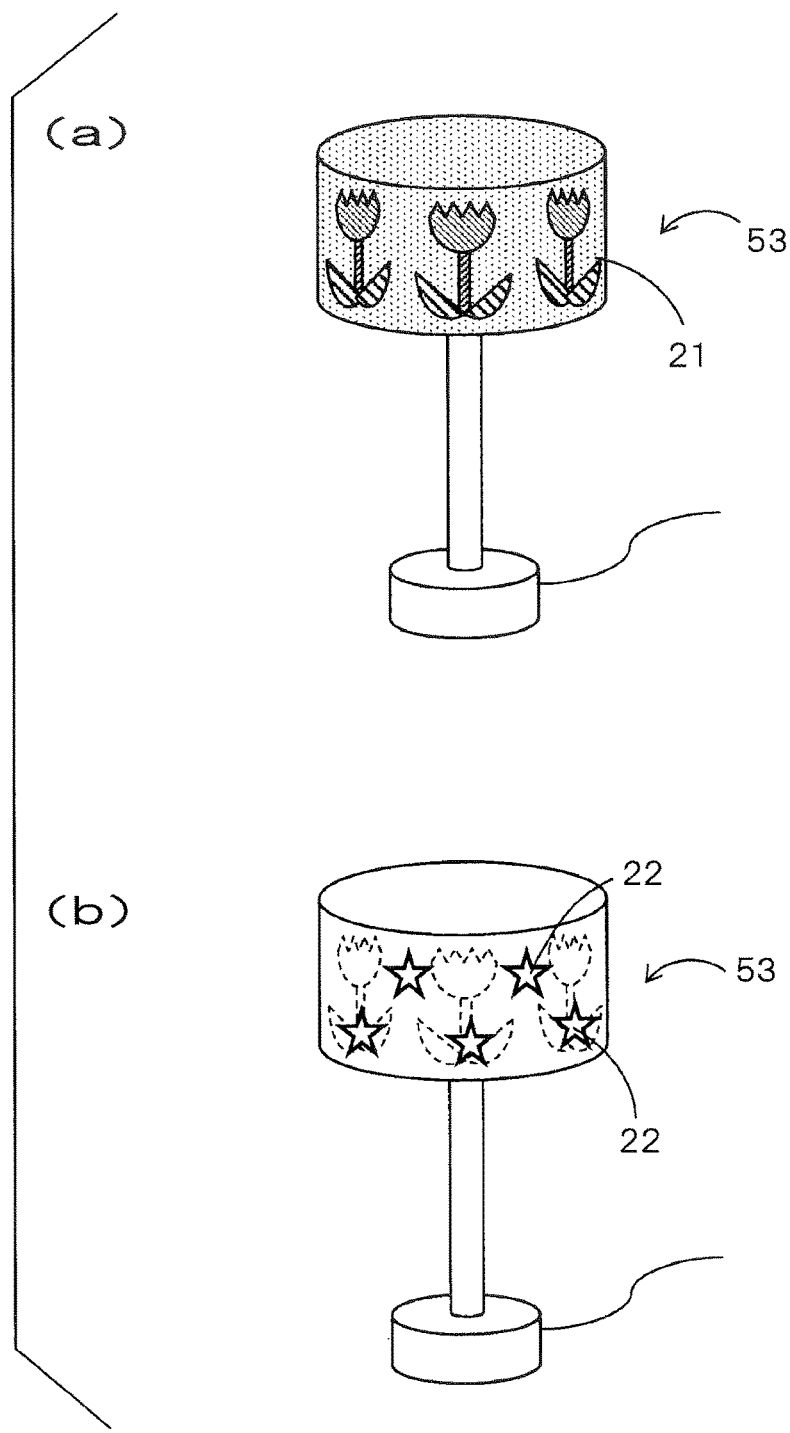
FIGS. 12(a) and 12(b) are views of an example of a lighting equipment comprising the display article of FIG. 1(a).

FIG. 12(*a*) and FIG. 12(*b*) show an example of a lighting equipment 53 on which the display article 10 of the above-described embodiment is installed.

The lighting equipment 53 shown in FIG. 12(*a*) and FIG. 12(*b*) is a table-top lamp including the display article 10 according to the above-described embodiment. The display article 10 is installed on a lamp shade of the lighting equipment 53, and is configured to display patterns of a plant as the first object 21 to be displayed, and to display star marks as the second object 22 to be displayed.

The lighting equipment 53 is equipped with a diffused light source (a light source of a substantial size) such as a fluorescent lighting and a point light source such as an LED inside the lamp shade. The diffused light source and the point light source can be alternately turned on by a switch.

As shown in FIG. 12(*a*), when the diffusion light source in the lighting equipment 53 is on, the viewer can perceive the first object 21 to be displayed, which is displayed by the display article 10 by incident ray from the diffusion light source.

On the other hand, as shown in FIG. 12(*b*), when the point light source in the lighting equipment 53 is on, the viewer can perceive the second object 22 to be displayed, which is displayed by the display article 10 by irradiation light from the point light source.

In this manner, the viewer can perceive the first object 21 to be displayed and the second object 22 to be displayed in response to the presence/absence of a point light source. Thus, by turning on or off the switch in this one lighting equipment 53, the viewer can enjoy a variety of designs at given timings.

The disclosed invention is not limited by the aforementioned discrete embodiments. The respective embodiments can be suitably combined as long as process contents are not contradictory.

What is claimed is:

1. A display article comprising:
a plurality of display areas;
wherein display areas adjacent to each other differ in at least one of an average hue, an average brightness and an average chroma;
wherein a first object to be displayed is formed by a combination of the plurality of display areas and is displayed in a place where a point light source or a laser light source is absent; and
wherein at least one of the display areas includes a Fourier transform hologram configured to convert an incident ray from the point light source or the laser light source into a second object to be displayed, the second object being different from the first object, wherein the second object is displayed in a place where the point light source or laser light source is present so as to be perceivable by a viewer.

2. The display article according to claim 1, wherein the Fourier transform hologram is an amplitude hologram.

3. The display article according to claim 1, wherein the number of the display areas is three or more.

4. The display article according to claim 1, wherein the plurality of display areas each have a pattern of interference fringes and function as a hologram,
wherein the display areas adjacent to each other differ in at least one of an average hue and an average chroma and each display area is perceived discretely from another display area adjacent to it, thereby the first object to be displayed is formed by a combination of the plurality of display areas,
wherein each display area includes a Fourier transform hologram configured to convert incident ray from a point light source or a laser light source into the second object to be displayed, and
wherein each display area includes a colorant.

5. The display article according to claim 1, wherein
a color difference $\Delta E^*_{ab}$ in the L*a*b* colorimetric system specified in JIS Z8781-4:2013 between display areas adjacent to each other is 2 or more.

6. A security medium comprising the display article according to claim 1.

7. A window comprising the display article according to claim 1.

8. A lighting equipment comprising the display article according to claim 1.

* * * * *